US012698670B2

(12) United States Patent
Ruedisser et al.

(10) Patent No.: US 12,698,670 B2
(45) Date of Patent: *Aug. 4, 2026

(54) WIRELESS RECEPTION AND TRANSMISSION

(71) Applicant: Julius Blum GmbH, Hoechst (AT)

(72) Inventors: Thomas Ruedisser, Hohenems (AT); Florian Burtscher, Dornbirn (AT); Thomas Taimler, Hoechst (AT)

(73) Assignee: Julius Blum GmbH, Hoechst (AT)

( * ) Notice: Subject to any disclaimer, the term of this patent is extended or adjusted under 35 U.S.C. 154(b) by 600 days.

This patent is subject to a terminal disclaimer.

(21) Appl. No.: 18/073,983

(22) Filed: Dec. 2, 2022

(65) Prior Publication Data

US 2023/0101191 A1 Mar. 30, 2023

Related U.S. Application Data

(63) Continuation of application No. PCT/AT2021/060196, filed on Jun. 2, 2021.

(30) Foreign Application Priority Data

Jun. 5, 2020 (AT) .............................. A 50491/2020

(51) Int. Cl.
*E05F 15/77* (2015.01)
*H04L 67/12* (2022.01)

(52) U.S. Cl.
CPC ......... *E05F 15/77* (2015.01); *E05Y 2400/664* (2013.01); *E05Y 2900/20* (2013.01); *H04L 67/12* (2013.01)

(58) Field of Classification Search
CPC .............. E05F 15/77; E05Y 2400/664; E05Y 2900/20; H04L 67/12; H04L 12/12;
(Continued)

(56) References Cited

U.S. PATENT DOCUMENTS 9,478,122 B2 10/2016 Hillie
9,836,034 B2 12/2017 Hille et al.
(Continued)

FOREIGN PATENT DOCUMENTS

CN 108685386 10/2018
CN 110557308 12/2019
(Continued)

OTHER PUBLICATIONS

International Search Report issued Aug. 18, 2021 in International (PCT) Application No. PCT/AT2021/060196.

*Primary Examiner* — Chad G Erdman
(74) *Attorney, Agent, or Firm* — Wenderoth, Lind & Ponack, L.L.P.

(57) ABSTRACT

A method for operating a system is formed by at least one furniture element, preferably a furniture drive or a furniture lock, with which at least one part of an item of furniture can be driven or activated, and at least one control device for controlling the at least one furniture element with a control command via an operating command. In a first receiving method step, the at least one control device wirelessly receives at least one digital operating command by at least one receiving device and, in a transmitting method step, the at least one control device wirelessly transmits at least one digital control command to a receiving device of the at least one furniture element by at least one transmitting device.

20 Claims, 8 Drawing Sheets

(58) Field of Classification Search
CPC .......... H04L 12/28; Y02D 30/50; G06F 7/02;
E05B 49/00; G08C 17/02
See application file for complete search history.

(56) References Cited

U.S. PATENT DOCUMENTS

| | | | |
|---|---|---|---|
| 10,376,075 | B2 | 8/2019 | Viermann et al. |
| 10,382,608 | B2 | 8/2019 | Gerhardt et al. |
| 10,708,410 | B2 | 7/2020 | Gerhardt et al. |
| 11,062,707 | B2 | 7/2021 | Judy et al. |
| 11,763,815 | B2 | 9/2023 | Judy et al. |
| 2011/0069914 | A1 | 3/2011 | Hashemi et al. |
| 2011/0205061 | A1 | 8/2011 | Wilson et al. |
| 2012/0082461 | A1* | 4/2012 | Meyer .............. H04N 21/42206 |
| | | | 398/106 |
| 2012/0098649 | A1 | 4/2012 | Grimm et al. |
| 2012/0280783 | A1 | 11/2012 | Gerhardt et al. |
| 2012/0280789 | A1 | 11/2012 | Gerhardt et al. |
| 2012/0280790 | A1 | 11/2012 | Gerhardt et al. |
| 2014/0021843 | A1 | 1/2014 | Hashemi et al. |
| 2014/0365773 | A1 | 12/2014 | Gerhardt et al. |
| 2015/0019020 | A1 | 1/2015 | Hille et al. |
| 2015/0102906 | A1 | 4/2015 | Gerhardt et al. |
| 2015/0130595 | A1* | 5/2015 | Hille ...................... G08C 23/04 |
| | | | 340/12.5 |
| 2015/0181014 | A1 | 6/2015 | Gerhardt et al. |
| 2017/0112716 | A1* | 4/2017 | Rawls-Meehan ........................... |
| | | | A61H 23/0263 |
| 2018/0191889 | A1 | 7/2018 | Gerhardt et al. |
| 2018/0289175 | A1 | 10/2018 | Lukas |
| 2018/0321662 | A1* | 11/2018 | Nixon ................. G06F 13/4072 |
| 2018/0325269 | A1 | 11/2018 | Viermann et al. |
| 2019/0216228 | A1* | 7/2019 | Bertinato ............... G05B 15/02 |
| 2019/0313808 | A1 | 10/2019 | Hille |
| 2019/0342443 | A1 | 11/2019 | Gerhardt et al. |
| 2020/0005783 | A1 | 1/2020 | Judy et al. |
| 2020/0018098 | A1 | 1/2020 | Chen et al. |
| 2020/0305605 | A1* | 10/2020 | Womack ................ G08C 19/00 |
| 2020/0329136 | A1 | 10/2020 | Gerhardt et al. |
| 2021/0106138 | A1 | 4/2021 | Gehrke et al. |
| 2021/0319793 | A1 | 10/2021 | Judy et al. |

FOREIGN PATENT DOCUMENTS

| | | |
|---|---|---|
| DE | 10 2014 104 051 | 9/2015 |
| DE | 20 2017 102 949 | 9/2018 |
| EP | 2 930 886 | 10/2015 |
| EP | 3 552 521 | 10/2019 |
| JP | 2003-1388212 | 5/2003 |
| JP | 2006-183359 | 7/2006 |
| JP | 2012-525522 | 10/2012 |
| JP | 2012-531542 | 12/2012 |
| JP | 2015-525621 | 9/2015 |
| JP | 2015-526941 | 9/2015 |
| JP | 2017-59418 | 3/2017 |
| JP | 2017-75494 | 4/2017 |
| JP | 2020-7899 | 1/2020 |
| JP | 2019-37412 | 3/2024 |
| WO | 2013/127961 | 9/2013 |
| WO | 2013/186356 | 12/2013 |

* cited by examiner 2,3

2,4

2,4

6

5

5

5

5

5

WIRELESS RECEPTION AND TRANSMISSION

BACKGROUND OF THE INVENTION

The present invention relates to a method for operating a system including at least one furniture element and at least one control device. The present invention further relates to such a system. Furthermore, the present invention relates to a computer program product for performing such a method. The present invention also relates to a control device for such a system.

Methods for operating systems consisting of at least one furniture element and at least one control device for driving or activating parts of items of furniture, and corresponding systems, are known in the state of the art. These methods for operating corresponding systems, which can serve for instance to open drawers or furniture doors in a drive-assisted manner, usually follow a rigidly predefined sequence in a fixedly predefined system architecture. Construction, configuration and operation of known, often highly integrated and proprietary systems can only be effected with great effort. Operation, expansion, or modification of the range of functions of such systems are often only possible by using a development environment and methodology predefined by the manufacturer. This creates rigid prerequisites for a co-operation of different operating elements and parts of the system.

SUMMARY OF THE INVENTION

The object of the invention is to specify a method, a system, a computer program product and a control device which do not have the disadvantages discussed above and in particular make a simplified construction, a simplified configuration and a simplified operation possible.

The object is achieved by a method for operating a system consisting of at least one furniture element and at least one control device as described below, a computer program product for performing such a method, such a system, and a control device for such a system.

The method relates in principle to the operation of a system consisting of at least one furniture element, preferably a furniture drive or a furniture lock, with which at least one part of an item of furniture is drivable or activatable, and at least one control device for actuating the at least one furniture element with a control command through an operating command.

A system operated according to the method can comprise at least one furniture element, which is preferably formed in the form of a furniture drive or a furniture lock. Through the method at least one part of an item of furniture can be drivable or activatable with the furniture element.

The furniture drive or the furniture lock can, in particular, be formed with an actuator or servomotor.

By a part of an item of furniture can be meant in particular a drawer, a furniture flap, or a furniture door. In general, by a part of an item of furniture can be meant a part that is movable relative to a furniture carcass, or an activatable—for example lockable or unlockable—part.

With a furniture element formed as a furniture drive, at least one part of an item of furniture—thus for example a drawer that can be moved in and out, a pivotable furniture flap or a pivotable furniture door—can be drivable in a method step.

With a furniture element formed as a furniture lock, at least one part of an item of furniture—thus for example a lockable drawer, a blockable furniture flap or a blockable furniture door—can be activatable, thus for example can be released for access by a user or locked, in a method step.

In the case of a furniture element formed as a furniture lock, for example, a part of the furniture lock, such as for instance a rotating rod or a locking bolt, can be activatable and optionally also drivable in a method step.

It is not to be ruled out that a furniture lock is provided by a furniture element formed as a furniture drive, in that an activatability of the furniture drive can be released or locked.

The method is characterized in that the at least one control device wirelessly receives at least one digital operating command by at least one receiving device in a first receiving method step and wirelessly transmits at least one digital control command to a receiving device of the at least one furniture element by means of at least one transmitting device in a transmitting method step.

A wireless actuation of the at least one furniture element can be effected by the at least one control device. The at least one furniture element can be actuated by the at least one control device wirelessly with a control command through a wirelessly received operating command.

In a first receiving method step, at least one incoming operating command can for example be wirelessly received by a control device of the system and, depending on the at least one operating command received, at least in a transmitting method step an outgoing control command for actuating at least one furniture element can for example be wirelessly emitted by at least one control device.

For carrying out the transmitting method step, the at least one control device can have at least one transmitting device, with which at least one digital control command is wirelessly transmissible to the at least one furniture element. Through the transmitting device, a digital signal can be transmissible to the at least one furniture element via a wireless transmission path, wherein the digital signal can be a digitally encoded control command.

It is advantageous if the at least one furniture element has a suitable receiving device.

A control command transmitted in a transmitting method step can generally be a digitally encoded data packet which is suitable for actuating the furniture element.

For carrying out the receiving method step, the at least one control device has at least one receiving device, with which at least one digital operating command transmitted according to a transmission protocol is receivable. Through the receiving device, a digital signal can be receivable by the control device via a wireless transmission path, wherein the digital signal can be an operating command digitally encoded according to a transmission protocol.

An operating command can generally be a digitally encoded data packet, which is receivable by a receiving device of the control device in a receiving method step.

An operating command can generally serve to operate or also configure the system or a part of the system.

The digital encoding and the wireless transmission of the operating commands can be effected according to one or more transmission protocols, wherein it is not ruled out that the transmission protocols can correspond to known standards.

Because a digital operating command is wirelessly received in a receiving method step and a digital control command is wirelessly transmitted in a transmitting method step, through the method an operation of the system can be easily adapted to a varying number of control devices and/or furniture elements. A wireless reception and transmission also simplifies the installation, configuration and maintenance of the system, as wired control lines need not be laid, allocated and kept in good condition.

It is not to be ruled out that the at least one control device has at least one transmitting device, which is formed for the wireless transmission of an operating command. In a first forwarding method step, for example, an operating command received by a control device of the system in a receiving method step can thereby be wirelessly forwarded to at least one further control device.

In an advantageous embodiment of the method, the digital operating command received in the receiving method step and the digital control command transmitted in the transmitting method step are received and transmitted according to different transmission protocols. A different transmission protocol can thereby be utilized depending on the requirement for the reception and transmission in the respective method step. The following requirements can be relevant for example for the use or the selection of a transmission protocol: range, data rate, security, energy requirement, infrastructure, redundancy, latency and/or availability.

In an advantageous embodiment of the method, in the transmitting method step a transmission of the at least one digital control command to the receiving device of the at least one furniture element can be effected using at least one of the following measures:

A transmission can be effected unidirectionally between the control device and a receiving device of the at least one furniture element. A bidirectional communication is not to be ruled out, but a bidirectional communication being effected can contribute to reduced latencies and to a reduced extent to the energy requirement.

A transmission can be effected addressed directly to a receiving device of the at least one furniture element. As a result, a "pairing" being effected before each transmission can be dispensed with, which can have a positive effect on the latencies. The address of the receiving device of a furniture element can have been stored for example in a memory of the control device in a configuration operating mode.

A transmission can be effected by a transmitting device of the furniture element without a confirmation of receipt. It can thereby be avoided for example that the furniture element has to be toggled between an operating mode in which the furniture element is in a ready-to-receive state and an operating mode in which the furniture element is in a ready-to-transmit state. A transmission can preferably be effected without an unsolicited confirmation of receipt. In principle, a transmission can be effected without a confirmation of receipt, wherein there is still the option of requesting a confirmation of receipt (for example depending on the composition of a control command).

A transmission can be effected without checking the readiness to receive of a receiving device of the at least one furniture element. It can be advantageous that the receiving device of the at least one furniture element is in principle in a ready-to-receive state and during operation does not have to be able to be transferred to a ready-to-receive state first. It is not to be ruled out that the furniture element can be able to be transferred to a ready-to-transmit state through a corresponding control command.

A transmission can be effected with a fixedly predefined or predefinable routing of the at least one digital control command. Thus, for example, a control command forwarded in a further transmitting method step can follow a fixedly predefined or fixedly predefinable routing between furniture elements of the system.

In an advantageous embodiment of the method, in the receiving method step a reception of the at least one digital operating command is effected according to a transmission protocol according to the IEEE 802.11 standard and/or the Bluetooth standard.

The standard denoted IEEE 802.11 is a known family of standards for Wireless Local Area Networks (WLAN). A transmission protocol chosen in such a way can make high data rates and a broad compatibility of the control device for devices by which operating commands can be received with the first receiving device of the control device possible.

The standard denoted Bluetooth is an industry standard for data transmission between devices over short distances by radio technology. A transmission protocol chosen in such a way can make a low energy consumption and a widespread compatibility of the control device for devices by which operating commands can be received with the receiving device of the control device possible.

In an advantageous embodiment of the method, in the transmitting method step a transmission of the at least one digital control command is effected according to a Shock-Burst™ or Enhanced ShockBurst™ transmission protocol.

ShockBurst™ or Enhanced ShockBurst™ are known radio transmission protocols and are designed for operation in the worldwide ISM frequency band at 2.4 GHz. A transmission protocol chosen in such a way can make a minimal energy consumption and minimal latencies for the actuation of at least one furniture element possible.

In an advantageous embodiment of the method, the control device has at least one user operating mode and one configuration operating mode, wherein:

in the user operating mode a reception of a digital operating command by the receiving device of the at least one control device for actuating at least one furniture element is effected, and/or in the configuration operating mode a reception of a digital operating command by the receiving device of the at least one control device for configuring the control device is effected.

In the user operating mode, a digital operating command for actuating at least one furniture element can be receivable by the receiving device of the at least one control device. The user operating mode can correspond to a normal use of the system, for example the day-to-day use of an item of furniture of the system after configuration of the system has been effected.

In the configuration operating mode, a digital operating command for configuring the control device and/or parts of the system can be receivable by the receiving device of the at least one control device.

As already mentioned, an operating command can serve to configure the system or a part of the system. Through such an operating command, in a configuring method step the furniture elements that the system comprises and how these are to be actuated through control commands can be stored for example in a memory of the control device. Through the provision of such a configuration operating mode, an initial configuration and also a further adaptation of the system carried out at a later point in time can be effected in a simple manner.

In the configuration operating mode, in a configuring method step for example addresses of the receiving device of the furniture elements, function allocations of the furniture elements with respect to their formation as a furniture drive or furniture lock, allocation of the furniture elements to drivable or activatable parts of at least one item of furniture of the system, information about the configuration of the transmission protocols, or general network architecture of the system can be stored in a memory in the control device through a digital operating command.

In an advantageous embodiment of the method, the at least one furniture element can have at least one user operating mode and one configuration operating mode, wherein at least one of the following measures can be taken:

The receiving device of the at least one furniture element can be in or transferrable to a ready-to-receive state in the user operating mode.

A reception of a digital control command by the receiving device of the at least one furniture element is effected in the user operating mode for activating at least one furniture element. This can be effected for example in an activating method step.

A reception of a digital control command by the receiving device of the at least one furniture element is effected in the user operating mode according to a Shock-Burst™ or Enhanced ShockBurst™ transmission protocol.

A reception of a digital control command is effected by a receiving device of the at least one furniture element in the configuration operating mode for configuring the furniture element. The control commands can be received according to a ShockBurst™ or Enhanced ShockBurst™ transmission protocol. This can be effected for example in a further configuring method step for configuring the furniture element.

A reception of a digital control command is effected by a receiving device of the at least one furniture element in the configuration operating mode according to a Bluetooth transmission protocol. This can be effected for example in a further configuring method step for configuring the furniture element.

In an advantageous embodiment of the method, in a first generating method step a generation of the at least one digital operating command can be effected by a user via a user interface.

A user can generate at least one operating command via an optionally menu-driven user interface, for example by selecting a menu item and confirming it through an interaction with an input device.

In an advantageous embodiment of the method, a generation can be effected through an interaction with the user interface by the user via:

a touchscreen of an input device, and/or a voice input into a speech-recognition device, and/or an operating element (buttons, foot switch) of an input device operable by a user by hand or foot, and/or gesture control of an input device—for example realized with sensors, such as infrared or ultrasonic sensors, or a camera—that can be performed by a user.

In principle, the method can be suitable for operating a system with one or more input devices.

An input device can in principle be a device operable by a user, such as for instance a computer, a tablet or a smartphone. A formation of an input device similar to a remote control—for example in the form of a radio switch—or an operating panel is not to be ruled out.

An input device can have a transmitting device, with which at least one operating command is wirelessly transmissible in a transmitting method step.

In an advantageous method embodiment, in a second generating method step at least one control command can be generated with the at least one operating command wirelessly received in the receiving method step.

Depending on the operating command received in the receiving method step:

different digital control commands can be generated in the generating method step, and/or different digital control commands can be transmitted in the transmitting method step.

It can be made possible for different furniture elements to be actuated and/or for furniture elements to be actuated differently depending on an operating command received, for example generated by a user, through different digital control commands. An actuation can differ with respect to speed, distance, permissibility or how it is performed.

In an advantageous embodiment of the method, in a further receiving method step a reception of the at least one wirelessly transmitted digital control command can be effected by a receiving device of the at least one furniture element.

After that, in an activating method step an activation of the furniture element, in particular a drive or an activation of at least one part of an item of furniture by the furniture element, can be effected through the at least one digital control command received.

An activation of the at least one furniture element with at least one control command wirelessly received by the receiving device of the furniture element can be effected, in a particularly advantageous embodiment of the method, by the control device within a period of less than 100 ms, preferably less than 50 ms, from the transmission of the digital control command.

It is not to be ruled out that at least one furniture element wirelessly forwards at least one digital control command wirelessly received beforehand to a receiving device of a further furniture element by at least one transmitting device allocated to the furniture element in a second forwarding method step.

Protection is also sought for a computer program product, comprising commands from a memory unit which is in or can be brought into data connection with the processing unit that, when executed by a processing unit, cause the latter to perform a method as described previously.

The computer program product can be stored, for example, in at least one memory unit of a control device and can be executed by the at least one processing unit of a control device.

Protection is further sought for a system consisting of at least one furniture element, preferably a furniture drive or a furniture lock, with which at least one part of an item of furniture is drivable or activatable, and at least one control device for actuating the at least one furniture element. Such a system can comprise at least one control device at least one transmitting device, with which at least one digital control command is wirelessly transmissible to the at least one furniture element, and at least one receiving device, with which at least one digital operating command is wirelessly receivable.

The at least one control device can, in principle, serve as an interface for the networking of different input devices and different furniture elements.

In an advantageous embodiment of the system:

the at least one digital operating command can be receivable by the receiving device according to the IEEE 802.11 standard and/or according to the Bluetooth standard, and/or the at least one digital control command can be transmissible according to a ShockBurst™ or Enhanced Shock-Burst™ standard.

In an advantageous embodiment of the system, the digital operating command can be generatable by a user via a user interface, wherein the user interface can be formed by:

a touchscreen of an input device, and/or a voice input into a speech-recognition device, and/or an operating element (buttons, foot switch) of an input device operable by a user by hand or foot, and/or gesture control of an input device—for example realized with sensors, such as infrared or ultrasonic sensors, or a camera—that can be performed by a user.

In an advantageous embodiment, the system can comprise at least one speech-recognition device for generating a digital operating command, wherein the speech-recognition device can comprise:

at least one microphone for detecting a voice command of a user, at least one conversion device for generating a digital operating command from the voice command, at least one transmitting device for transmitting a digital operating command to the control device.

The individual constituents of the speech-recognition device can be distributed across different devices and services. Thus, in one embodiment, there can be a microphone in an input device, for example a smartphone, there can be a conversion device for generating a digital operating command from the voice command through a computerized service, optionally decentralized in a cloud service, and there can be a transmitting device for transmitting a digital operating command to the control device again in an input device, for instance a smartphone again.

In an advantageous embodiment of the system, the control device and the furniture element can be formed structurally separate from each other and can be arrangeable or arranged spatially separate from each other. In such an embodiment, a control device and a furniture element can be installed independently of each other.

Protection is also sought for a control device for a system as described previously.

Such a control device can advantageously have at least one processing unit at least one memory unit that is in or can be brought into data connection with it.

BRIEF DESCRIPTION OF THE DRAWINGS

Embodiments of the invention are discussed with reference to the figures, in which.

DETAILED DESCRIPTION OF THE INVENTION

Figure 1:
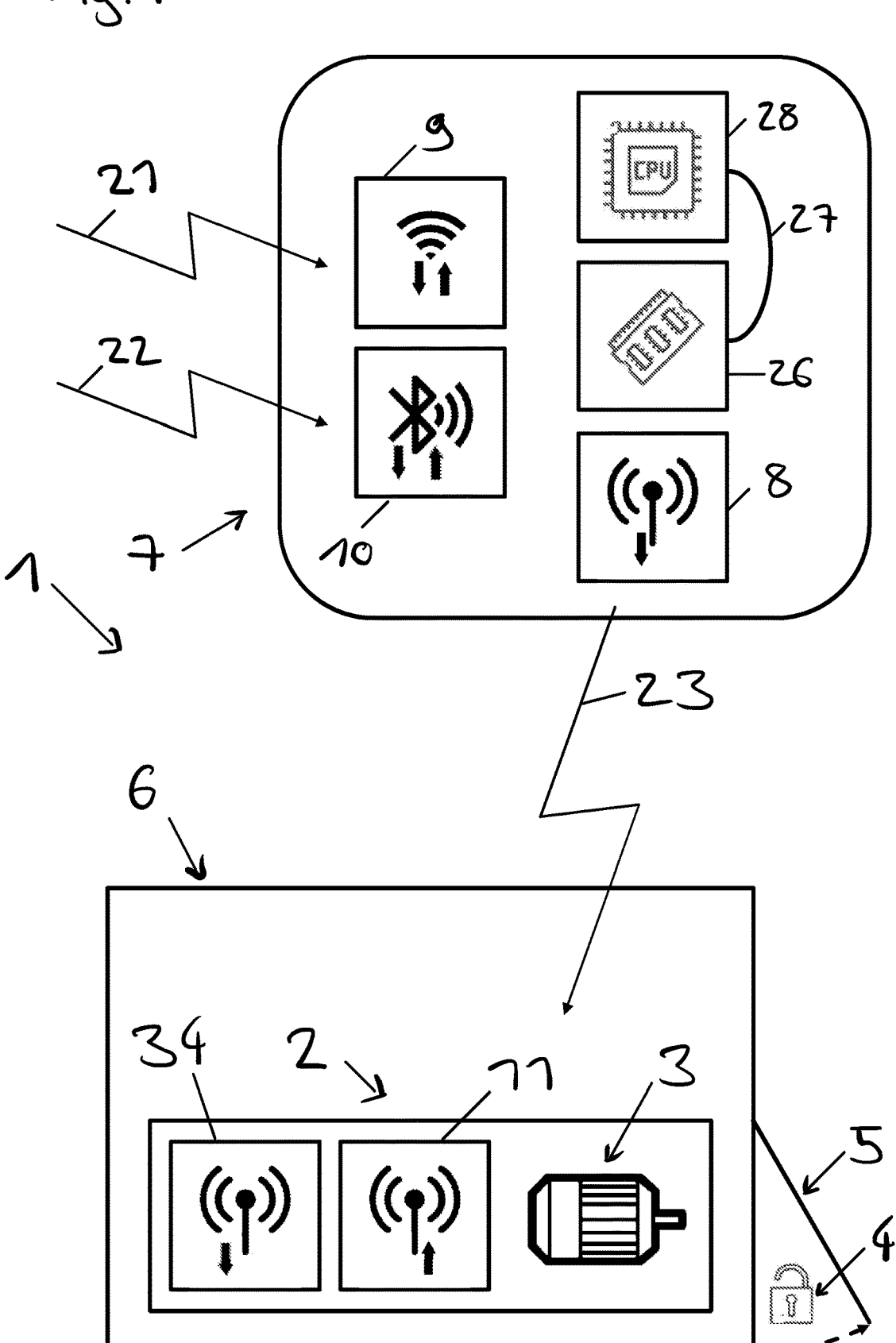
FIG. 1 is a schematic representation of an embodiment of a system.

FIG. 1 shows an embodiment of a system 1 consisting of a furniture element 2, for instance a furniture drive 3 or a furniture lock 4, with which at least one part 5 of an item of furniture 6 is drivable or activatable, and a control device 7 for actuating the at least one furniture element 2 with a control command through an operating command. The control device 7 has at least one transmitting device 8, with which at least one digital control command is wirelessly transmissible to a receiving device 11 allocated to the furniture element 2. In the embodiment shown, a digital operating command transmitted according to a transmission protocol 21 is receivable with a receiving device 9. In the embodiment shown, the control device 7 has a further receiving device 10, with which a digital operating command transmitted according to a second transmission protocol 22, which is different from the first transmission protocol 21, receivable. It is not absolutely necessary to provide a further receiving device 10.

At least one digital operating command can be transmitted with the transmitting device 8, with which the at least one digital control command is wirelessly transmissible to the at least one furniture element 2, according to a third transmission protocol 23 which, in this embodiment, is different from the first 21 and second 22 transmission protocols.

The first transmission protocol 21 can advantageously be a radio transmission protocol according to the IEEE 802.11 standard.

The second transmission protocol 22 can advantageously be a radio transmission protocol according to the Bluetooth standard.

Advantageously, the digital control command can be transmissible according to a third transmission protocol 23 which, as shown in this embodiment, is different from the first and second transmission protocols 21, 22, wherein the third transmission protocol 23 can be a radio transmission protocol according to a ShockBurst™ or Enhanced Shock-Burst™ standard.

Optionally, the furniture element 2 can have a transmitting device 43. It is conceivable that a digital control command is transmissible with the optional transmitting device 43 according to the third transmission protocol 23.

In the embodiment shown, the control device 7 has a processing unit 25 and a memory unit 26 that is in or can be brought into data connection 27 with it. In such an embodiment, the control device 7 can be suitable to a computer program product, comprising commands from the memory unit 26 which, when executed by the processing unit 25, cause the latter to perform a method as described below.

The control device 7 can have at least one user operating mode and one configuration operating mode, wherein in the user operating mode a digital operating command for actuating at least one furniture element 2 is receivable by the first 9 and/or second 10 receiving device of the at least one control device 7 and/or in the configuration operating mode a digital operating command for configuring the control device 7 is receivable by the first 9 and/or second 10 receiving device of the at least one control device 7.

In the configuration operating mode for example addresses of the receiving device 11 of the furniture elements 2, function allocations of the furniture elements 2 with respect to their formation as a furniture drive 3 or furniture lock 4, allocation of the furniture elements 2 to drivable or activatable parts 5 of at least one item of furniture 6 of the system 1, information about the configuration of the transmission protocols 21, 22, 23, or general network architecture of the system 1 can be stored in a memory unit in the control device 7 through a digital operating command.

In the embodiment shown, the control device 7 and the furniture element 2 of the system 1 are formed structurally separate from each other and are arrangeable or arranged spatially separate from each other.

Figure 2:
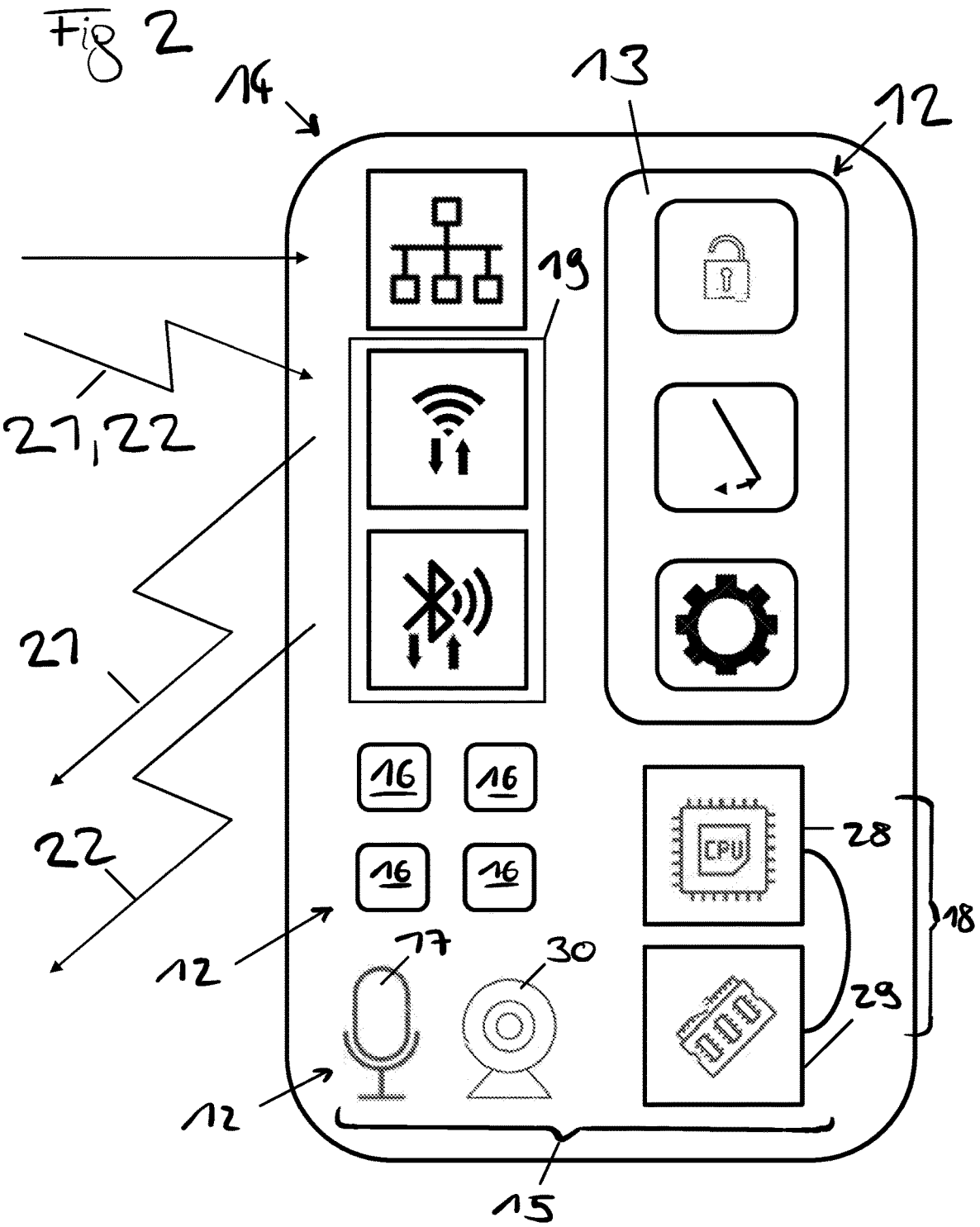
FIG. 2 is a schematic representation of an embodiment of an input device.

FIG. 2 shows a particularly advantageous embodiment of an input device 14, wherein this input device has different embodiments of user interfaces 12.

As represented, the user interface 12 can be formed by:
a touchscreen 13 of the input device 14, and/or
a voice input into a speech-recognition device 15, and/or
an operating element 16 of the input device 14 operable by a user by hand or foot, and/or
gesture control of the input device 14 that can be performed by a user, here for example with the aid of the camera 30.

For example, operating commands can be generated and transmitted by the input device 14. Through the operating commands, an actuation of a furniture element 2, a configuration of the system 1 and in particular of the control device 7, and a change into different operating modes of the control device 7 and the furniture elements 2 can be effected.

Unlike what is represented, the individual user interfaces 12 can be split onto different input devices 14 formed separate from each other.

In the embodiment shown, the input device 14 has a combined transmitting and receiving device 19, by means of which a data transmission according to the transmission protocols 21, 22 is possible. The input device 14 can also have separate, fewer or more, devices for data transmission.

The speech-recognition device 15 for generating a digital operating command comprises, in the embodiment shown:
at least one microphone 17 for detecting a voice command of a user,
at least one conversion device 18 for generating a digital operating command from the voice command, wherein the conversion device 18 here is formed with commands from a memory unit 29 that can be executed by the processing unit 28,
at least one transmitting device, in this embodiment formed by way of example as a transmitting and receiving device 19 of the input device 14, for transmitting a digital operating command to the control device 7.

Unlike what is represented in the embodiment of FIG. 2, for speech-recognition device 15, there can be a microphone 17 in an input device 14, for example a smartphone, and there can be a conversion device 15 for generating a digital operating command from the voice command through a computerized service, optionally decentralized in a cloud service (see FIG. 3), and there can be a transmitting device for transmitting a digital operating command to the control device 7 again in an input device 14, for instance a smartphone again.

A gesture control of an input device 14 that can be performed by a user can be provided analogously with the aid of a sensor, in the embodiment shown for instance with the camera 30, and with commands from a memory unit 29 that can be executed by the processing unit 28.

Figure 3:
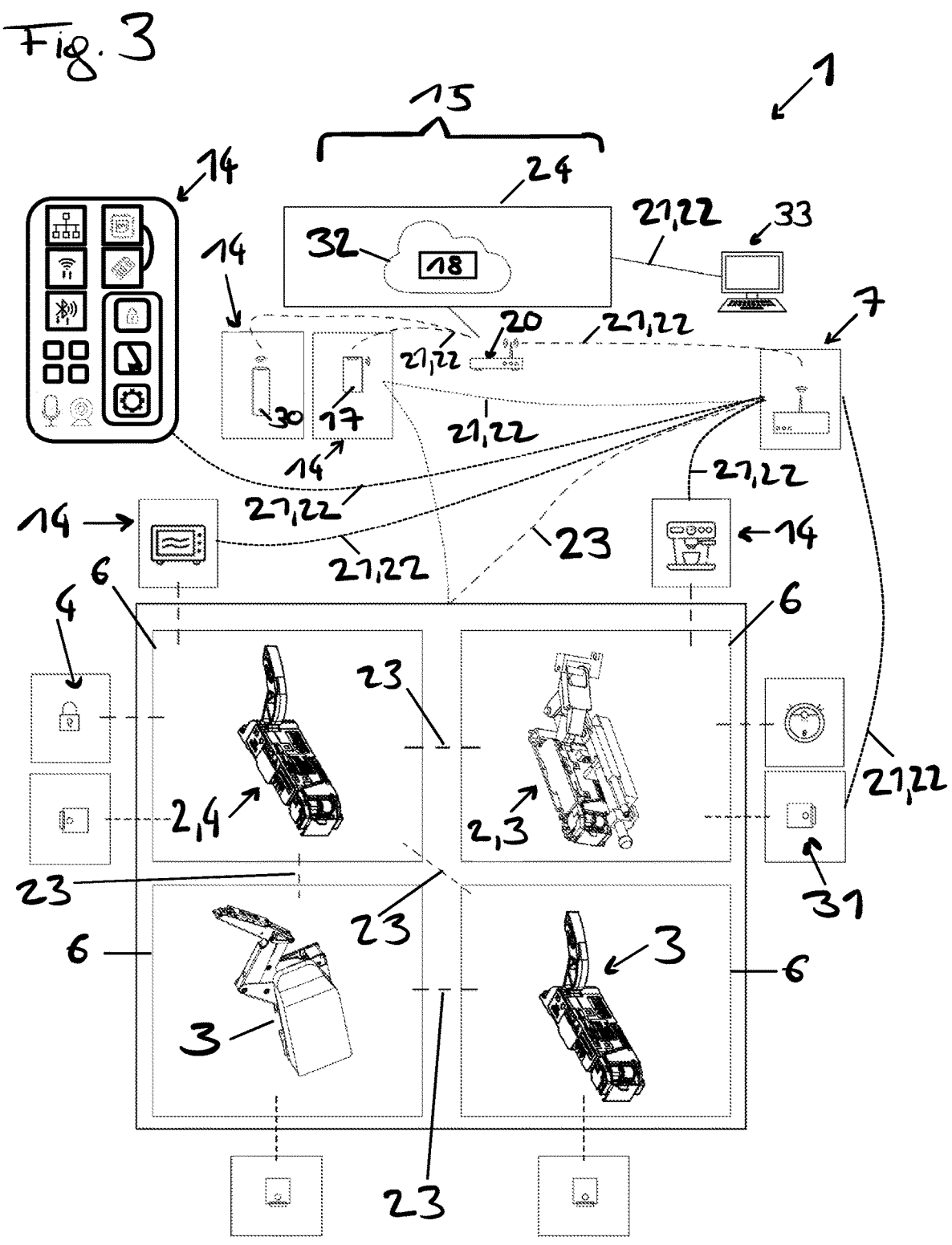
FIG. 3 is a schematic representation of a further embodiment of a system.

A particularly preferred embodiment of a system 1 is shown in FIG. 3.

The system first of all has different furniture elements 2, which are formed as furniture drives 3 for different furniture flaps and furniture doors, and as a furniture lock 4. The system 1 further has a control device 7 for actuating the furniture elements 2, wherein the control device 7 can in principle be formed according to the embodiment shown in FIG. 1.

In the embodiment shown, the system 1 has different input devices 14, with which in each case at least one digital operating command encoded according to a first transmission protocol 21 and/or according to a second transmission protocol 22, which is different from the first transmission protocol 21, is transmissible to the control device. It can correspondingly be provided that the at least one control device 7 comprises at least one first receiving device 9, with which at least one digital operating command transmitted according to a first transmission protocol 21 is receivable, and at least one second receiving device 10, with which at least one digital operating command transmitted according to a second transmission protocol 22, which is different from the first transmission protocol 21, is receivable.

The different input devices 14 can be formed for example in the form of the embodiment shown in FIG. 2 of an input device 14, in the form of operating elements of a kitchen appliance, such as a microwave or a coffee machine, or in the form of a computer 33, a radio switch 31, or in the form of smart devices, such as for instance so-called intelligent personal assistants. Such input devices 14 can in principle have functionalities such as those of the embodiment shown in FIG. 2.

In the embodiment shown, the system 1 has at least one internet-compatible communication device 20 for connecting the system 1, in particular the control device 7, to the internet 24. A data transmission can be effected according to a first transmission protocol 21 and/or according to a second transmission protocol 22, which is different from the first transmission protocol 21.

In addition to an embodiment as described previously of a speech-recognition device 15, the system 1 can alternatively or additionally have a further embodiment of a speech-recognition device 15 for generating a digital operating command which, in the embodiment shown in FIG. 3, comprises at least the following components or assemblies:
at least one microphone 17 for detecting a voice command of a user,
at least one conversion device 18 for generating a digital operating command from the voice command, wherein the conversion device 18 can be implemented through a computerized service, as represented here for example decentralized in a cloud service 32 on the internet 24,
at least one transmitting device for transmitting a digital operating command to the control device 7.

It is conceivable that a digital control command transmitted according to the third transmission protocol 23 and received by a receiving device 11 of a furniture element 2 is forwardable to at least one further furniture element 2 by means of a transmitting device 43 of the furniture element 2. Analogously, this is conceivable for a forwarding of digital control commands between at least 2 control devices 7.

Figure 4A:
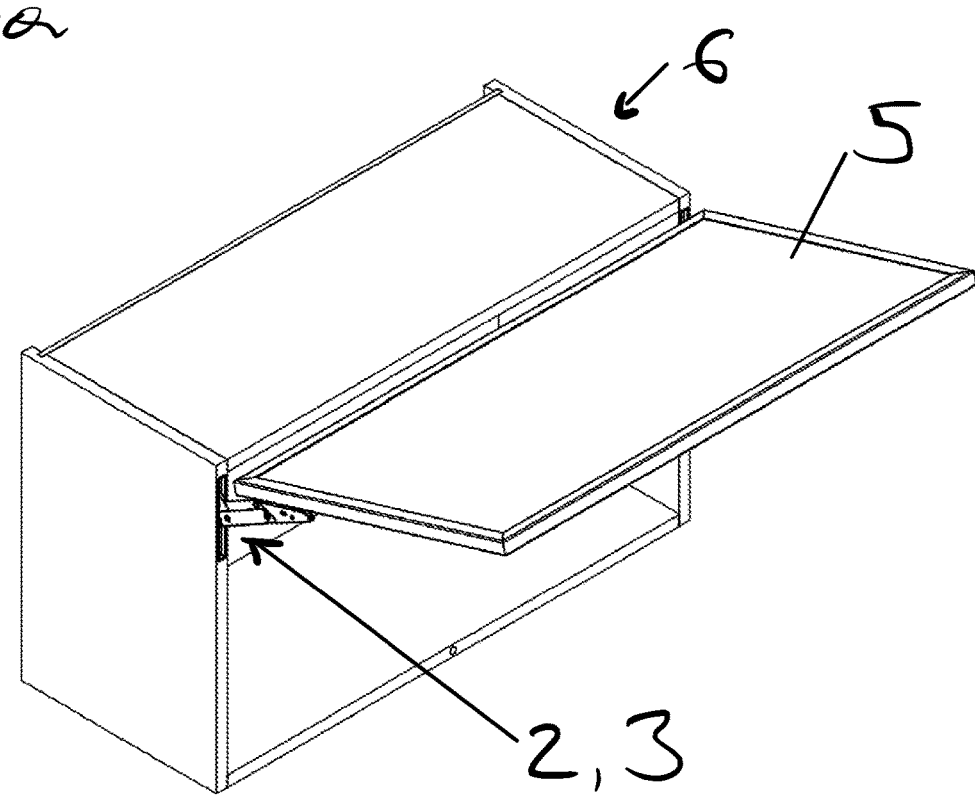
FIGS. 4*a* and 4*b* are perspective views of embodiments of items of furniture.

FIG. 4a shows an embodiment of an item of furniture 6 as a wall unit with a part 5, drivable by a furniture element 3 formed as a furniture drive 3, in the form of a swing-up flap.

Figure 4B:
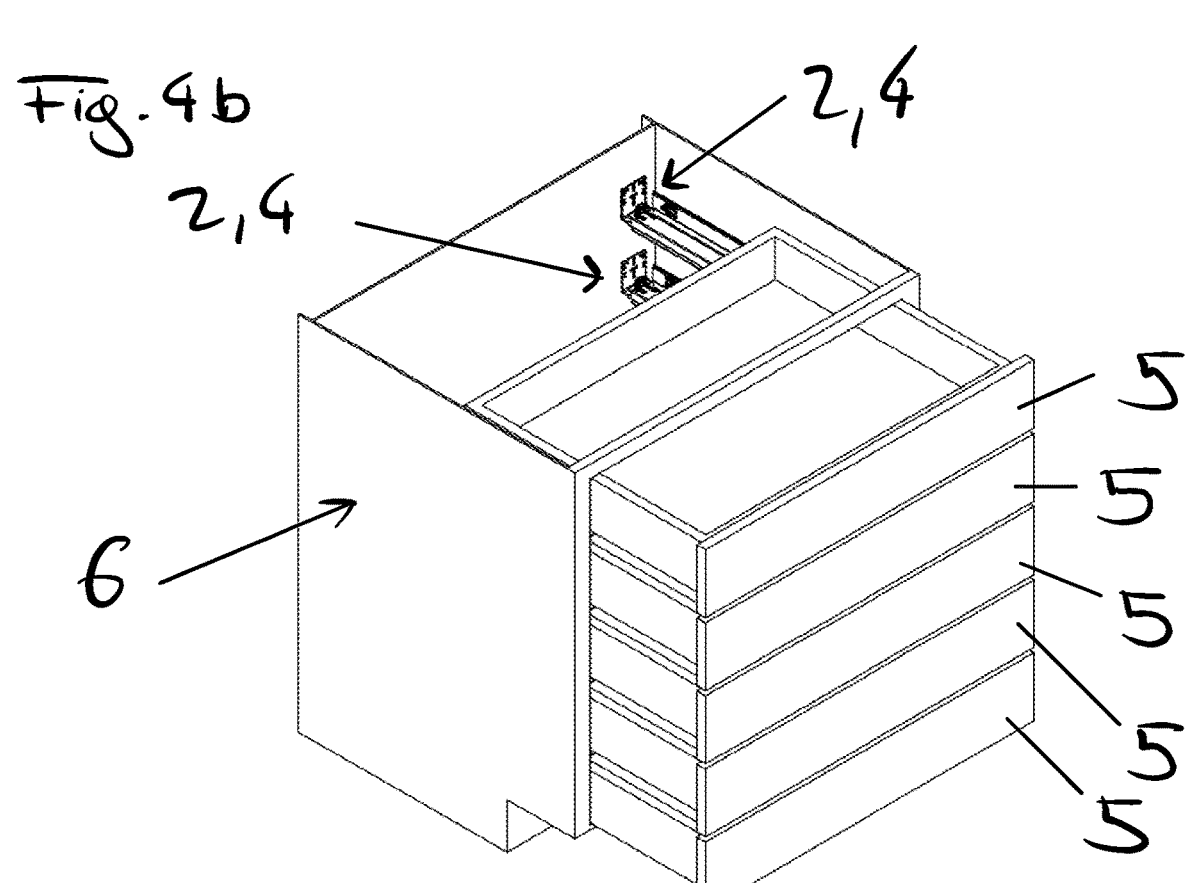

FIG. 4b shows an embodiment of an item of furniture 6 as a chest of drawers with a part 5, lockable by a furniture element 3 formed as a furniture lock 4, in the form of individual drawers.

Figure 5:
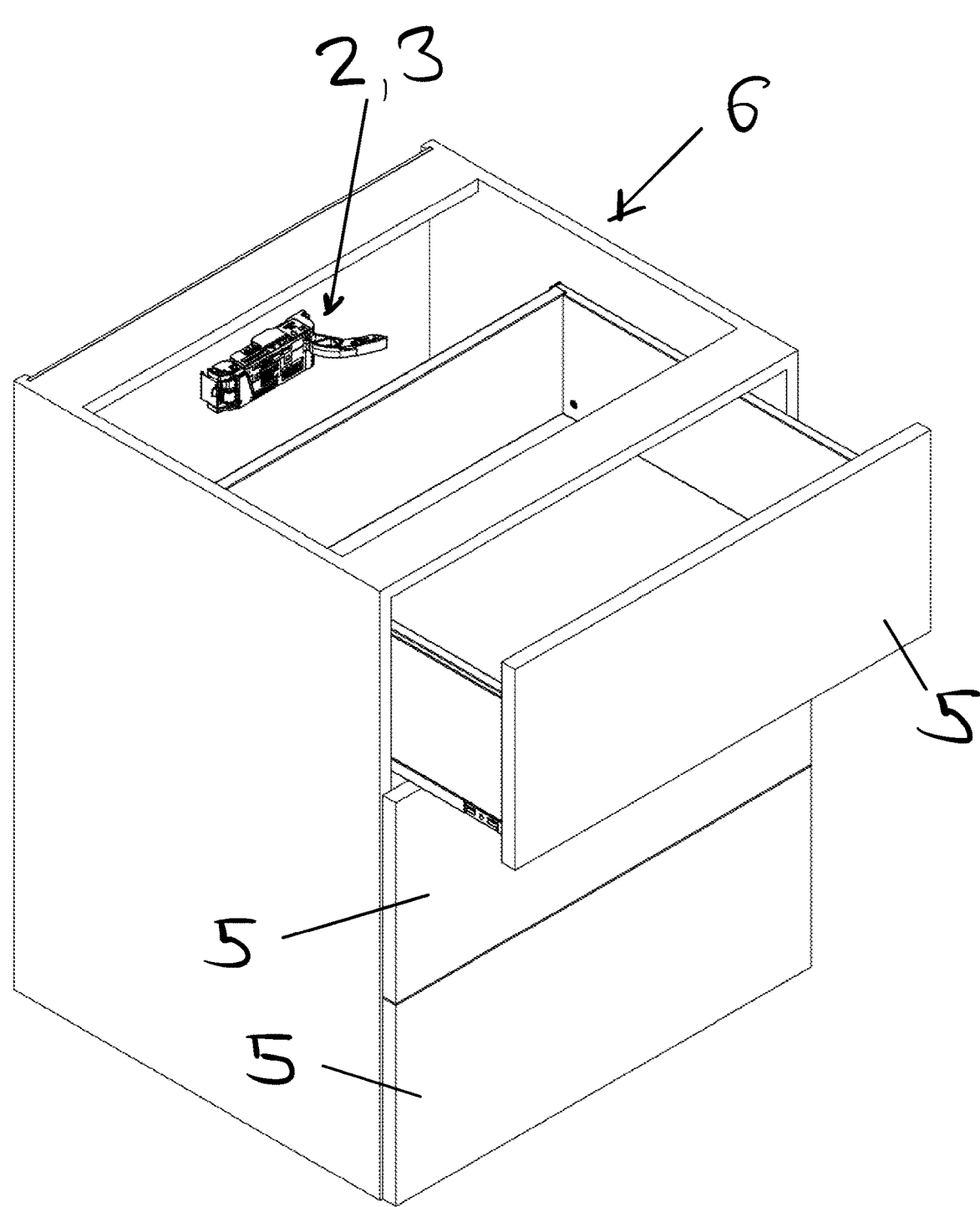
FIG. 5 is a perspective view of a further embodiment of an item of furniture.

FIG. 5 shows an embodiment of an item of furniture 6 as a chest of drawers with a part 5, drivable by a furniture element 3 formed as a furniture drive 3, in the form of individual drawers.

Figure 6:
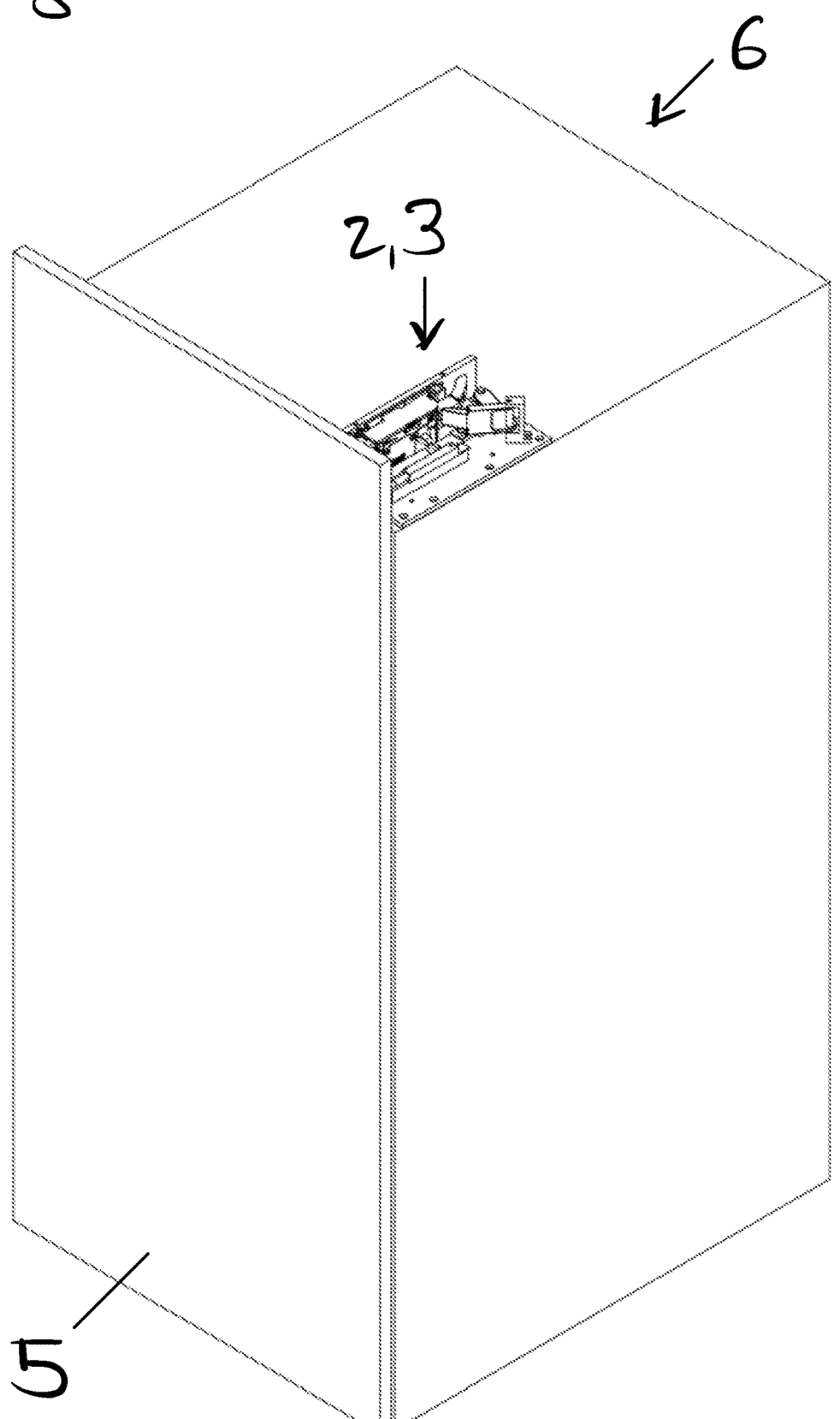
FIG. 6 is a perspective view of a further embodiment of an item of furniture.

FIG. 6 shows an embodiment of an item of furniture 6 as a refrigerator with a part 5, drivable by a furniture element 3 formed as a furniture drive 3, in the form of a furniture door.

The sequence of an embodiment of a method for operating an embodiment of a system 1 as described previously is represented in a block diagram in FIG. 7, wherein reference numbers are used to refer to the previously described parts of the embodiments of the system 1.

In the embodiment shown, the method comprises the following method steps:

the at least one control device 7 wirelessly receives at least one digital operating command by means of at least one first receiving device 9 in a receiving method step c, and the at least one control device 7 wirelessly transmits at least one digital control command to a receiving device 11 of the at least one furniture element 2 by means of the at least one transmitting device in a transmitting method step f.

The digital operating command received in the receiving method step c and the digital control command transmitted in the transmitting method step f can be received and transmitted according to different wireless transmission protocols 21, 22, 23.

It is possible for:

a reception to be effected according to a first transmission protocol 21 according to the IEEE 802.11 standard in the receiving method step c, and/or a reception to be effected according to a second transmission protocol 22 according to the Bluetooth standard in the receiving method step c, and/or a transmission to be effected according to a third transmission protocol 23, which is different from the first 21 and second 22 transmission protocols, according to the ShockBurst™ or according to the Enhanced Shock-Burst™ standard in the transmitting method step f.

Figure 8:
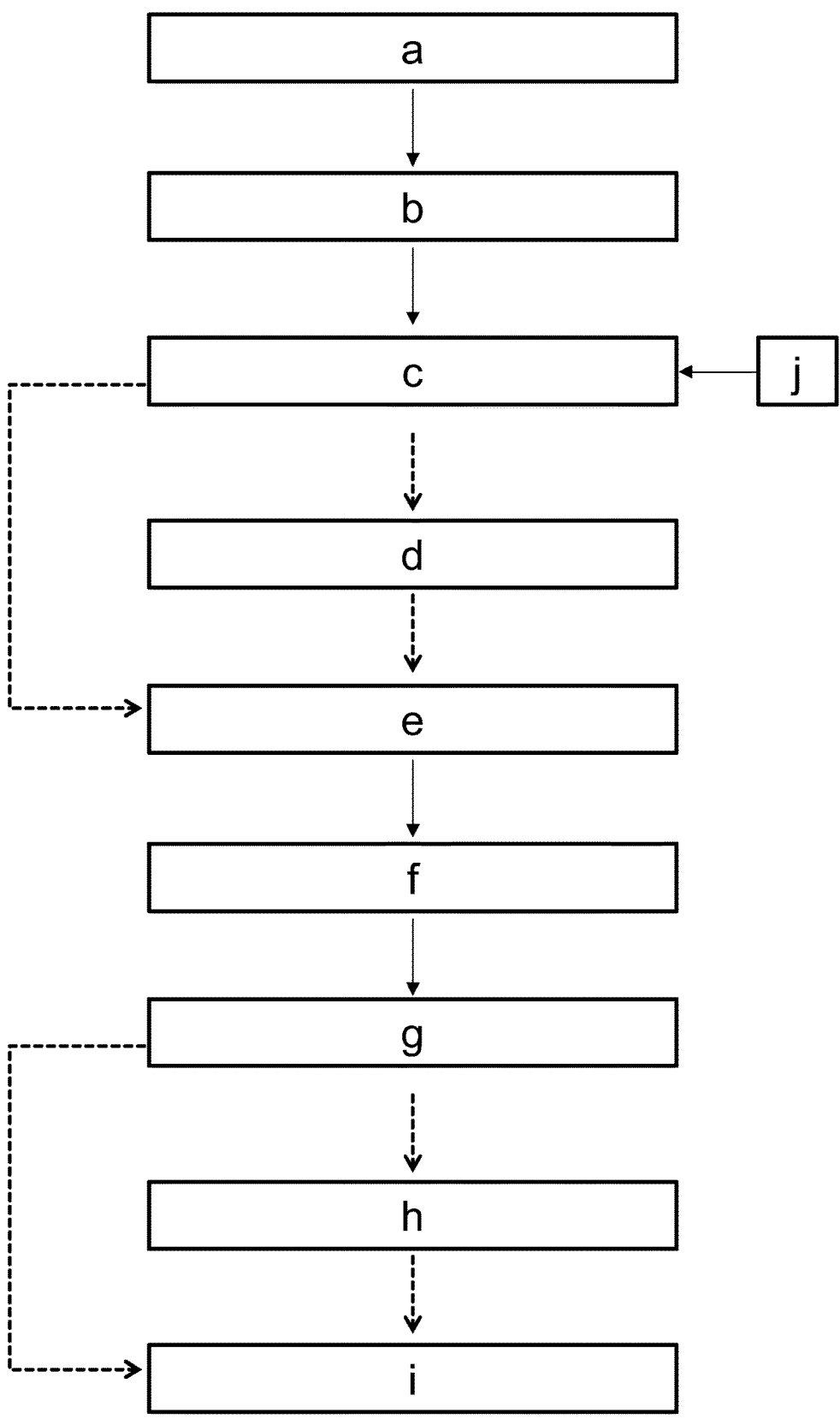
FIG. 8 is a schematic sequence of a further embodiment of a method.

The sequence of a particularly preferred embodiment of a method for operating an embodiment of a system 1 as described previously is represented in a block diagram in FIG. 8, wherein reference numbers are again used to refer to the previously described parts of the embodiments of the system 1. For the operation of the system 1, it is not necessary always to perform all of the listed method steps.

In the embodiment shown, the method comprises at least the following method steps:

a first generating method step a, an operating command transmitting method step b, a receiving method step c, an optional first forwarding method step d, a second generating method step e, a transmitting method step f, a further receiving method step g, an optional second forwarding method step h, an activating method step l, a configuring method step j, A generation of the at least one digital operating command can be effected by a user via a user interface 12 in a first generating method step a, wherein a generation can be effected through an interaction with the user interface 12 by the user via:

a touchscreen of an input device 14, and/or a voice input into a speech-recognition device, and/or an operating element of an input device 14 operable by the user by hand or foot, and/or gesture control of an input device 14 that can be performed by a user.

A transmission of at least one digital operating command to at least one control device 7 can be effected in an operating command transmitting method step b.

Figure 7:
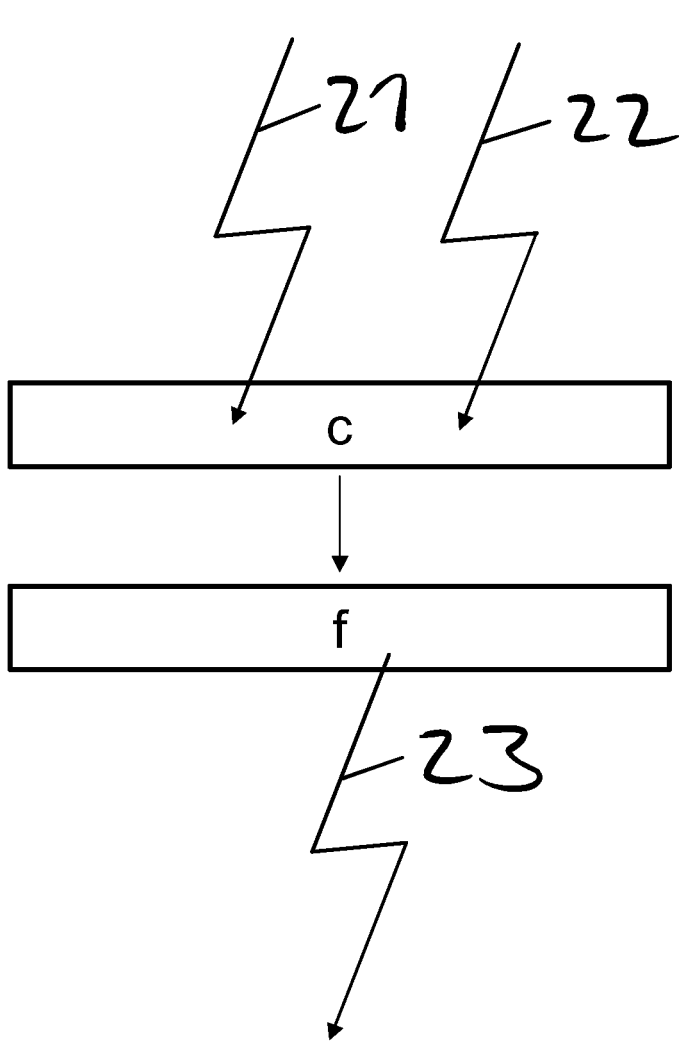
FIG. 7 is a schematic sequence of an embodiment of a method.

The reception of at least one digital operating command can be effected analogously to the embodiment of the method in FIG. 7 in a receiving method step c.

In a user operating mode of the control device 7 a reception of a digital operating command by the receiving device 9, 10 of at least one control device 7 for actuating at least one furniture element 2 is effected.

In a configuration operating mode of the control device 7 a reception of a digital operating command by the receiving device 9, 10 of the at least one control device 7 for configuring the control device 7 is effected, wherein a configuration can be effected in a corresponding configuring method step j.

Optionally, for example to increase the range, an operating command received in the receiving method step c can be forwarded to at least one further control device 7 in a forwarding method step d.

In a second generating method step e at least one control command can be generated with the at least one operating command received in the receiving method step c.

In the second generating method step e, depending on the operating command received in the receiving method step c:

different digital control commands can be generated in the generating method step e, and/or different digital control commands can be transmitted in the transmitting method step f.

The transmission of at least one digital control command can be effected analogously to the embodiment of the method in FIG. 7 in a transmitting method step f.

In a second receiving method step g a reception of the at least one digital control command can be effected by a receiving device 11 of at least one furniture element 2.

Optionally, for example to increase the range, a control command received in the receiving method step c can be forwarded to at least one further furniture element 2 in a second forwarding method step h.

In an activating method step i an activation of the furniture element 2, in particular a drive or an activation of at least one part 5 of an item of furniture 6 by the furniture element 2, can be effected through the at least one digital control command received.

LIST OF REFERENCE NUMBERS

1 system
2 furniture element
3 furniture drive
4 furniture lock
5 part
6 item of furniture
7 control device
8 control device transmitting device
9 receiving device
10 further receiving device
11 furniture element receiving device
12 user interface
13 touchscreen
14 input device
15 speech-recognition device
16 operating element 17 microphone
18 conversion device
19 input device transmitting and receiving device
20 communication device
21 first transmission protocol
22 second transmission protocol
23 third transmission protocol
24 internet
25 processing unit
26 memory unit
27 data connection
28 processing unit
29 memory unit
30 camera
31 radio switch
32 cloud service
33 personal computer
34 furniture element transmitting device
a first generating method step
b operating command transmitting method step
c first receiving method step
d first forwarding method step
e second generating method step
f transmitting method step
g further receiving method step
h second forwarding method step
i activating method step
j configuring method step

The invention claimed is:

1. A method for operating a system comprising a furniture element configured to drive or activate a part of an item of furniture, and a control device for actuating the furniture element with a control command through an operating command, the method comprising:

wirelessly receiving a digital operating command using a receiving device of a control device in a first receiving step, wirelessly transmitting a digital control command to a receiving device of the furniture element by a transmitting device, effecting a reception of the wirelessly transmitted digital control command by the receiving device of the furniture element in a second receiving step, and effecting an activation of the furniture element through the digital control command wirelessly received by the receiving device of the furniture element using the control device within a period of less than 100 ms from the transmission of the digital control command.

2. The method according to claim 1, wherein the digital operating command received in the first receiving step and the digital control command wirelessly transmitted are received and transmitted according to different transmission protocols.

3. The method according to claim 1, wherein the wirelessly transmitting the digital control command to the receiving device of the element includes:

unidirectionally effecting transmission between the control device and the receiving device of the furniture element, and/or directly addressing transmission to the receiving device of the furniture element, and/or effecting transmission by a transmitting device of the furniture element without a confirmation of receipt, and/or effecting transmission without checking the readiness to receive of the receiving device of the furniture element, and/or effecting transmission with a fixedly predefined or pre-definable routing of the digital control command.

4. The method according to claim 3, wherein the wirelessly transmitting of the digital control command to the receiving device of the element includes effecting transmission by the transmitting device of the furniture element without requesting the confirmation of receipt.

5. The method according claim 1, wherein:

in the first receiving step, a reception of the digital operating command is effected using a transmission protocol according to the IEEE 802.11 standard and/or the Bluetooth standard, and/or the wirelessly transmitting comprises effecting transmission of the digital control command according to a ShockBurst™ or Enhanced ShockBurst™ transmission protocol.

6. The method according to claim 1, wherein the control device has a user operating mode and a configuration operating mode, wherein:

in the user operating mode, a reception of the digital operating command by the receiving device of the control device for actuating the furniture element is effected, and/or in the configuration operating mode, a reception of the digital operating command by the receiving device of the control device for configuring the control device is effected.

7. The method according to claim 1, wherein the furniture element has a user operating mode and a configuration operating mode, wherein:

the receiving device of the furniture element is in or transferrable to a ready-to-receive state in the user operating mode, and/or a reception of the digital control command by the receiving device of the furniture element is effected in the user operating mode for activating the furniture element, and/or a reception of the digital control command by the receiving device of the furniture element is effected in the user operating mode according to a ShockBurst™ or Enhanced ShockBurst™ transmission protocol, and/or a reception of the digital control command is effected by the receiving device of the furniture element in the configuration operating mode for configuring the furniture element, and/or a reception of the digital control command is effected by the receiving device of the furniture element in the configuration operating mode according to a Bluetooth transmission protocol.

8. The method according to claim 1, further comprising generating the digital operating command by a user via a user interface.

9. The method according to claim 8, wherein the generating is effected through an interaction with the user interface by the user via:

a touchscreen of an input device, and/or a voice input into a speech-recognition device, and/or an operating element of an input device operable by the user by hand or foot, and/or a gesture control of an input device performed by the user.

10. The method according to claim 1, further comprising generating the digital control command with the digital operating command received in the first receiving step.

11. The method according to claim 10, wherein, depending on the digital operating command received in the first receiving step:

different digital control commands are generated in the generating, and/or different digital control commands are transmitted in the wirelessly transmitting.

12. The method according to claim 1, wherein the activation of the furniture element comprises an activation of a drive or an activation of at least one part of an item of furniture by the furniture element.

13. The method according to claim 1, wherein the activation of the furniture element is effected by the control device within a period of less than 50 ms from the transmission of the digital control command.

14. A computer program product stored on a non-transitory computer-readable medium, the computer program comprising commands from a memory unit to be brought into data connection with a processing unit configured to, when the commands are executed by the processing unit, perform:

wirelessly receiving a digital operating command using a receiving device of a control device in a first receiving step, wirelessly transmitting a digital control command to a receiving device of the furniture element by a transmitting device, effecting a reception of the wirelessly transmitted digital control command by the receiving device of the furniture element in a second receiving step, and effecting an activation of the furniture element through the digital control command wirelessly received by the receiving device of the furniture element using the control device within a period of less than 100 ms from the transmission of the digital control command.

15. A system comprising:

a furniture element configured to drive or activate a part of an item of furniture, and a control device for actuating the furniture element, the control device including:

a transmitting device configured to wirelessly transmit a digital control command to the furniture element, and a first receiving device configured to wirelessly receive a digital operating command, wherein the control device is configured to actuate the furniture element to:

wirelessly receive the digital operating command using the first receiving device in a first receiving step, wirelessly transmit the digital control command to a second receiving device of the furniture element by the transmitting device, effect a reception of the wirelessly transmitted digital control command by the second receiving device in a second receiving step, and effect an activation of the furniture element through the digital control command wirelessly received by the second receiving device using the control device within a period of less than 100 ms from the transmission of the digital control command.

16. The system according to claim 15, wherein:

the digital operating command is receivable by the receiving device according to the IEEE 802.11 standard and/or according to the Bluetooth standard, and/or the digital control command is transmissible according to a ShockBurst™ or Enhanced ShockBurst™ standard.

17. The system according to claim 15, further comprising a user interface configured to allow a user to generate the digital operating command, wherein the user interface includes:

a touchscreen of an input device, and/or a voice input into a speech-recognition device, and/or an operating element of an input device operable by the user by hand or foot, and/or gesture control of an input device that can be performed by the user.

18. The system according to claim 15, wherein the transmitting device of the control device is a first transmitting device, the system further comprising a speech-recognition device configured to generate the digital operating command, wherein the speech-recognition device includes:

a microphone configured to detect a voice command of a user, a conversion device configured to generate the digital operating command from the voice command, and a second transmitting device configured to transmit the digital operating command to the control device.

19. The system according to claim 15, wherein the control device and the furniture element are structurally separate from each other and are arranged spatially separate from each other.

20. A control device for the system according to claim 15.

* * * * *